(12) United States Patent
Zima et al.

(10) Patent No.: US 11,840,358 B2
(45) Date of Patent: Dec. 12, 2023

(54) LIGHTER-THAN-AIR HOVERING DRONE

(71) Applicants: Brian Zima, Upper Saddle River, NJ (US); Kristof Jebens, Baden Wurttemberg (DE); Agalya Jebens, Baden Wurttemberg (DE)

(72) Inventors: Brian Zima, Upper Saddle River, NJ (US); Kristof Jebens, Baden Wurttemberg (DE); Agalya Jebens, Baden Wurttemberg (DE)

( * ) Notice: Subject to any disclaimer, the term of this patent is extended or adjusted under 35 U.S.C. 154(b) by 0 days.

(21) Appl. No.: 17/689,960

(22) Filed: Mar. 8, 2022

(65) Prior Publication Data

US 2022/0194583 A1 Jun. 23, 2022

Related U.S. Application Data (63) Continuation-in-part of application No. 16/656,554, filed on Oct. 17, 2019, now Pat. No. 11,504,641.

(Continued)

(51) Int. Cl.
*B64D 47/08* (2006.01)
*B64B 1/40* (2006.01)
(Continued)

(52) U.S. Cl.
CPC ............... *B64D 47/08* (2013.01); *B64B 1/40* (2013.01); *B64B 1/62* (2013.01); *B64D 47/02* (2013.01); *B64D 2211/00* (2013.01); *B64U 10/30* (2023.01); *B64U 50/13* (2023.01); *B64U 2101/30* (2023.01); *B64U 2201/20* (2023.01)

(58) Field of Classification Search
CPC .... B64B 1/62; B64B 1/24; B64B 1/26; B64B 1/28; B64B 1/40; B64U 10/30
See application file for complete search history.

(56) References Cited

U.S. PATENT DOCUMENTS 4,729,750 A 3/1988 Prusman
4,931,028 A 6/1990 Jaeger et al.
(Continued)

FOREIGN PATENT DOCUMENTS

CN 202295280 7/2012
CN 107685854 2/2018

*Primary Examiner* — Nicholas McFall
*Assistant Examiner* — Eric Acosta
(74) *Attorney, Agent, or Firm* — LaMorte & Associates, P.C.

(57) ABSTRACT

A remote controlled lighter-than-air drone assembly that is capable of prolonged flight. The drone assembly utilizes a balloon structure. Separately, a reservoir is provided for holding a smaller second volume of gas. A propulsion system and a control unit are carried by the balloon structure. The control unit selectively transfers the gas from the reservoir to the balloon structure, and selectively vents the gas as needed. A receiver is used to receive command signals from an external source. The command signals are utilized to operate the propulsion system. An electronics suite is provided that can be altered depending upon duties. The electronics suite is used to scan or otherwise monitor an area below the drone assembly. In flight, the balloon structure is translucent and internally illuminated. A projector can be provided for projecting images onto the interior of the balloon structure.

18 Claims, 9 Drawing Sheets

Related U.S. Application Data

(60) Provisional application No. 63/158,850, filed on Mar. 9, 2021.

(51) Int. Cl.
  *B64B 1/62* (2006.01)
  *B64D 47/02* (2006.01)
  *B64U 10/30* (2023.01)
  *B64U 50/13* (2023.01)
  *B64U 101/30* (2023.01)

(56) References Cited

U.S. PATENT DOCUMENTS

| | | |
|---|---|---|
| 5,149,015 A | 9/1992 | Davis |
| 5,429,542 A | 7/1995 | Britt, Jr. |
| 5,906,335 A | 5/1999 | Thompson |
| 6,364,733 B1 | 4/2002 | Escauriza et al. |
| 6,520,824 B1 | 2/2003 | Caroselli |
| 7,055,777 B2 * | 6/2006 | Colting ............ B64B 1/02 244/30 |
| 8,303,367 B2 | 11/2012 | English |
| 9,367,067 B2 | 6/2016 | Gilmore et al. |
| 10,000,284 B1 * | 6/2018 | Purwin ............ G05D 1/104 |
| 10,101,443 B1 * | 10/2018 | LeGrand, III ...... G05D 3/00 |
| 2008/0090487 A1 | 4/2008 | Randall |
| 2008/0268742 A1 | 10/2008 | Shenhar |
| 2011/0292348 A1 * | 12/2011 | Tobita ............ B64B 1/40 353/121 |
| 2013/0035017 A1 | 2/2013 | English |
| 2018/0281949 A1 | 10/2018 | Mitchell |
| 2019/0030447 A1 | 1/2019 | Zima |

\* cited by examiner

LIGHTER-THAN-AIR HOVERING DRONE

RELATED APPLICATIONS

This application is a continuation-in-part of co-pending U.S. application Ser. No. 16/656,554 filed Oct. 17, 2019.

This application claims the benefit of provisional patent application No. 63/158,850, filed Mar. 9, 2021.

BACKGROUND OF THE INVENTION

1. Field of the Invention

In general, the present invention relates to flying toys, such as toy drones. More particularly, the present invention relates to the structure of toy drones that are lighter-than-air and stay aloft due to buoyant forces.

2. Prior Art Description

Small flying drones in the form of toy helicopters and toy quadcopters are becoming increasingly popular in the marketplace. Toy drones are typically battery-operated. The size and motor power of a drone determines the weight that the drone is capable of carrying into flight. As a consequence, small drones typically carry small batteries that can power the drone for only short periods of time. Furthermore, small drones are typically provided with light plastic propellers that are unlikely to cause harm if contacted while spinning. Accordingly, most small drones have batteries and blade configurations that are only capable of keeping them aloft for less than ten minutes before the batteries need to be recharged. This makes such drones poor choices for any application where a drone needs to be in flight for a prolonged periods of time, such as a few hours. There are many applications where a drone with a prolonged ability to fly would be highly useful. For example, if a drone is being used to provide illumination to a dark area, such illumination by be desired for hours at a time. Alternatively, a person might want a drone to follow them as they walk around an event. Likewise, a person might want a drone to randomly fly around a building with security sensors, fire detection sensors and the like. In this scenario, flight times as long as twelve hours would be desirable to provide overnight surveillance.

One way to increase the ability of a small drone to stay aloft is to decrease the weight of the drone. The less a drone weighs, the less power is required to keep it aloft. The less power that is required, the longer the batteries carried by the drone will last. One of the most efficient ways to decrease the effective weight of a drone is to make the drone part of a lighter-than-air system. In the prior art, there have been toy drones designed that are lighter than air. Such prior art is exemplified by U.S. Pat. No. 4,931,028 to Jager, entitled "Toy Blimp", and U.S. Pat. No. 5,429,542 to Britt, entitled "Helium Filled Remote Controlled Saucer Toy". These prior art drones use helium filled bodies to fly. Altitude and direction of flight are driven by motors controlled remotely.

In U.S. Pat. No. 6,520,824 to Caroselli, entitled "Toy Balloon Vehicle", a control unit is disclosed that is designed to attach to one or more latex balloons that are filled with helium. As with the previously cited prior art, the control unit steers and propels the lighter-than-air construct.

One problem associated with lighter-than-air toys is that the altitude of the toy is very difficult to control. Lighter-than-air toys are very light and are easily moved by even a slight breeze or updraft. Furthermore, air density varies from point-to-point as does air temperature. All of these variables affect the altitude of a lighter-than-air toy. In all the previously cited prior art, the battery powered motors are used to help control the altitude of the lighter-than-air toy. This causes the control motors on the toys to constantly run as they compensate for wind drift. The constant running of the control motors consumes battery power and diminishes the effective time that the lighter-than-air toy can stay aloft.

In U.S. Pat. No. 5,149,015 to Davis, entitled "Radio Controlled Hot Air Balloon", a toy hot air balloon, often referred to as a Chinese lantern, is fitted with a controller. The controller selectively increases the size of a burning flame. This changes the temperature of the air within the balloon and the buoyancy of the balloon. This can help the toy rise if caught in a down draft. However, the control has a large time delay and can do nothing to compensate for an updraft.

A need therefore exists for an improved lighter-than-air drone, wherein rapid adjustments in altitude can be achieved without having to constantly run control propellers. In this manner, battery power is conserved and the lighter-than-air drone can be kept aloft in controlled flight for extended periods of time. This need is met by the present invention as described and claimed below.

SUMMARY OF THE INVENTION

The present invention is a remote controlled lighter-than-air drone assembly that is capable of prolonged flight. The drone assembly utilizes a balloon structure for holding a first volume of the lighter-than-air gas. Separately, a reservoir is provided for holding a smaller second volume of said lighter-than-air gas. The reservoir is separate and distinct from the balloon structure and is carried by the balloon structure.

A propulsion system is carried by the balloon structure. The propulsion system provides controlled thrust to the balloon structure during flight. A control unit is also carried by the balloon structure to selectively control the propulsion system. The control unit selectively transfers the lighter-than-air gas from the reservoir to the balloon structure, and selectively vents the lighter-than-air gas from the balloon structure.

A receiver is carried by the balloon structure to receive remote command signals from an external source. The remote command signals are utilized by the control unit to operate the propulsion system.

An electronics suite is provided that can be altered depending upon intended duties. The electronics suite is carried by the balloon structure and can be used to scan or otherwise monitor an area below the lighter-than-air toy drone assembly when the lighter-than-air toy drone assembly is in flight.

In flight, the balloon structure is translucent and internally illuminated. A projector can be provided for projecting images onto the interior of the balloon structure.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention lighter-than-air drone can be embodied in many ways, only a few exemplary embodiments are illustrated and described. The exemplary embodiments are selected in order to set forth some of the best modes contemplated for the invention. The illustrated embodiments, however, are merely exemplary and should not be considered limitations when interpreting the scope of the appended claims.

Figure 1:
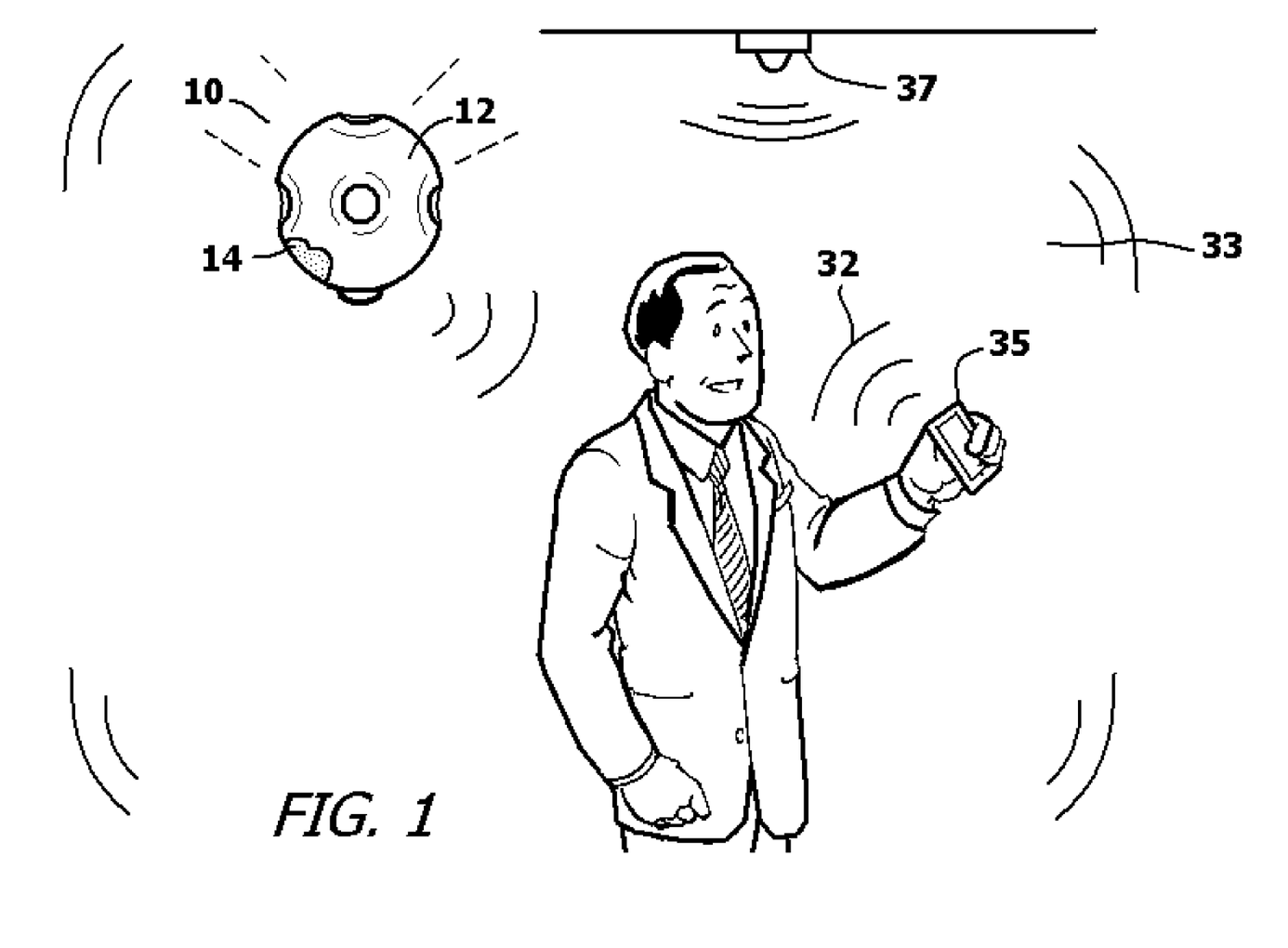
FIG. 1 is a perspective view of an exemplary embodiment of a toy drone assembly shown in conjunction with a user having a smart phone and a WiFi hub that can generates personal data networks.
Figure 2:
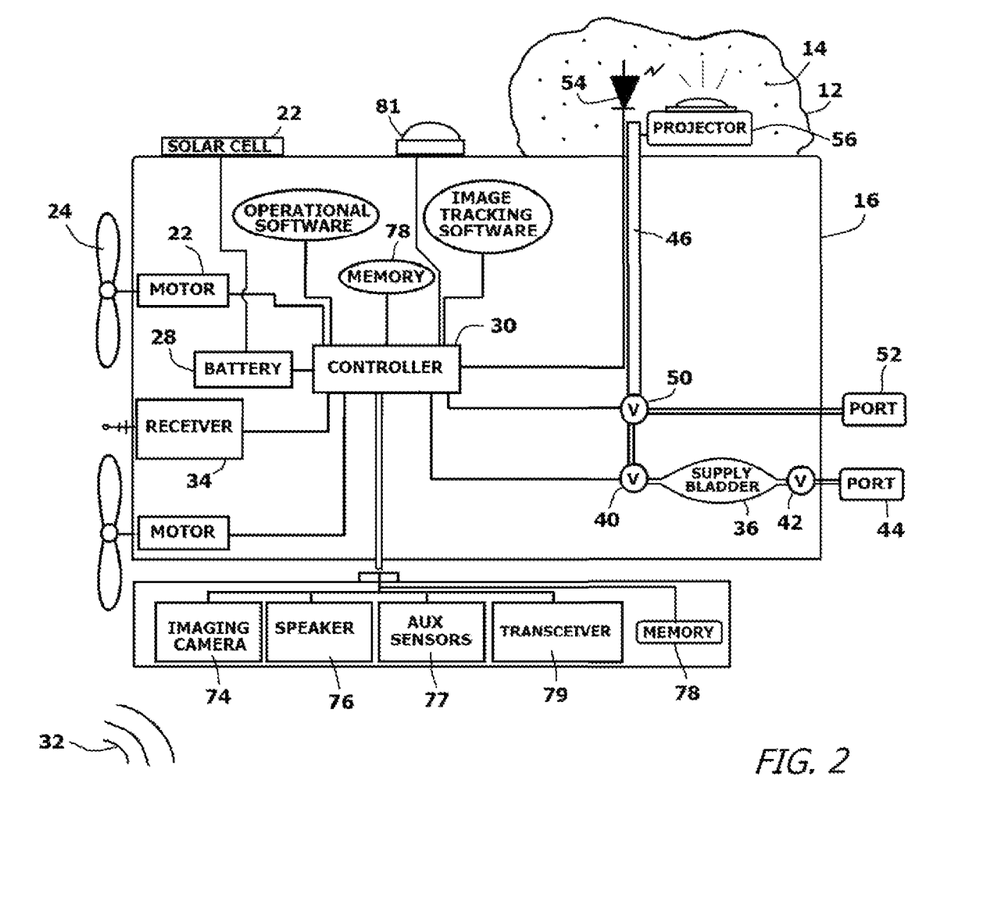
FIG. 2 is a schematic showing the control elements within the toy drone assembly.

Referring to FIG. 1 and FIG. 2, a first embodiment of a lighter-than-air drone assembly 10 is shown. The drone assembly 10 is capable of staying aloft for prolonged periods of flight that can last several hours. The drone assembly 10 includes a balloon structure 12 which is filled with a lighter-than-air gas 14, such as helium. The balloon structure 12 has a volume large enough to lift the remaining components of the drone assembly 10 into flight when fully inflated with the lighter-than-air gas 14. As will be later detailed, the balloon structure 12 is preferably made from a non-elastic polymer film, such as Mylar®, that is spherically shaped when inflated. However, other shapes can be used. Furthermore, it is preferred that the balloon structure 12 be translucent to light so that it can be internally illuminated and appear to glow in low light conditions. As such, the overall drone assembly 10 has the appearance of a floating, glowing orb when in flight.

The balloon structure 12 supports an internal flight control unit 16 and an electronics suite 20. The intended purpose of the lighter-than-air drone 10 is to fly the electronics suite 20 over an area where the electronics suite 20 can collect data and/or emit data. As will be explained, the flight control unit 16 contains one or more propulsion systems 18 that are used to produce thrust and controlled flight for the drone assembly 10. In flight, the drone assembly 10 is neutrally buoyant in ambient air and is able to maintain a selected altitude with little or no motorized assistance. As such, the drone assembly 10 can stay aloft and in controlled flight for long periods of time. As will later be explained, the drone assembly 10 carries flight controls and navigation controls that enable the drone assembly 10 to hover at a selected altitude and fly in a predetermined pattern over a selected area. Alternately, the drone assembly 10 can be used to fly above or near a person and follow that person as the person moves. The drone assembly 10 has the ability to self compensate for changes in wind drafts and air density. Furthermore, the drone assembly 10 has the ability to automatically land should it be swept away in strong winds.

The flight control unit 16 contains at least one propulsion system 18. The propulsion system 18 can be a motor and propeller. Alternatively, the propulsion system 18 can be a piezoelectric ultrasound transducer that produces thrust by generating acoustic waves. If more than one propulsion system 18 is used, each of the propulsion systems 18 can be used individually or in unison.

The propulsion systems 18 are powered by a rechargeable battery 28. One or more optional solar cells 22 can be provided on the drone assembly 10 to help prolong the charge life of the rechargeable battery 28. In the preferred embodiment, the solar cells 22 can produce enough power to operate the drone assembly 10, provided the drone assembly 10 is being flown in sunlight or under bright lights.

Each propulsion system 18 is connected to a controller 30. The controller 30 regulates the flow of electricity from the battery 28 to each propulsion system 18. The controller 30, in turn, is controlled by incoming control signals 32. The controller 30 is coupled to a receiver 34, which can receive remotely broadcast control signals 32. The control signals 32 can be radio signals, Bluetooth® signals, infrared control signals, or laser light controls. Control signals 32 can also come through the electronics suite 20 in the form of audio signals or voice commands that are detected by the electronics suite 20. In the preferred embodiment, the control signals 32 are localized radio signals that operate as a personal area network 33, such as a Bluetooth® personal area network generated from a smart phone 35. In this manner, a person can control the flight of the drone assembly 10 using only a smart phone 35 or a building WiFi hub 37. Furthermore, by measuring the strength of the personal area network 33 transmitted by a smart phone 35 or WiFi hub 37, the controller 30 in the drone assembly 10 can determine when the drone assembly 10 is flying beyond a predetermined effective range.

The propulsion systems 18 control forward movement, reverse movement, and turning movement of the drone assembly 10. In other words, the propulsion systems 18 control movement in the X-Y plane that is parallel to the ground. However, vertical movement in the vertical Z-plane does not rely solely on the propulsion systems 18. Rather, the up and down movements in the vertical plane Z-plane are controlled, at least in part, by changing the buoyancy of the overall drone assembly 10.

The balloon structure 12, when fully inflated with a lighter-than-air gas 14, provides an upward buoyant force. The buoyant force of the balloon structure 12 is opposed by the weight of the flight control unit 16, electronics suite 20, propulsion systems 18 and other components that comprise the drone assembly 10. If the buoyant force is equal to the weight, then the drone assembly 10 has a neutral buoyancy and the drone assembly 10 will float in a fixed position, unless affected by wind or another external force. The weight of the drone assembly 10 is designed to be slightly less than the buoyant force of the fully inflated balloon structure 12. As such, there is a net upward lifting force that is provided by the balloon structure 12 when fully inflated. However, the balloon structure 12 need not be fully inflated at all times. Within the internal control unit 16 there is a gas reservoir 36 for holding a volume of the lighter-than-air gas 14. The gas reservoir 36 can be replaced with a lightweight gas cartridge or any other lightweight vessel capable of holding a volume of the lighter-than-air gas 14 under pressure. In the preferred embodiment, the gas reservoir 36 is a high-strength supply bladder. The supply bladder is fillable and holds a small volume of lighter-than-air gas 14 at a pressure that is higher than the pressure within the balloon structure 12. In this manner, some lighter-than-air gas 14 can be transferred to the balloon structure 12 from the gas reservoir 36 if needed to increase buoyancy.

In the flight control unit 16, the flow of lighter-than-air gas 14 into and out of the gas reservoir 36 is controlled by valves 40, 42. The operation of the valves 40, 42 is controlled by the controller 30. The first valve 40 connects the gas reservoir 36 to the balloon structure 12. The second valve 42 connects the gas reservoir 36 to a fill port 44. Accordingly, the controller 30 can transfer lighter-than-air gas 14 from the gas reservoir 36 to the balloon structure 12 to selectively increase the buoyancy of the drone assembly 10.

The balloon structure 12 is filled with the lighter-than-air gas 14. The lighter-than-air gas 14 is introduced into the balloon structure 12 through an elongated tube 46 that extends from the first valve 40 to the balloon structure 12. The elongated tube 46 serves multiple functions. The elongated tube 46 is a conduit that enters the balloon structure 12. Furthermore, the elongated tube 46 enables lighter-than-air gas 14, supplied at the fill port 44, to fill the balloon structure 12. With the first valve 40 and the second valve 42 open, the lighter-than-air gas 14 can flow through the gas reservoir 36 and into the balloon structure 12 via the elongated tube 46. When the first valve 40 is closed, the gas reservoir 36 will fill and store lighter-than-air gas 14 for later use.

A vent valve 50 is also provided that controls flow through the elongated tube 46. The vent valve 50 connects the elongated tube 46 to a vent port 52. The vent valve 50 allows the lighter-than-air gas 14 from the balloon structure 12 to vent into the surrounding environment when the drone assembly 10 is in flight. As such, if a person wants the drone assembly 10 to lower its altitude, then the controller 30 may receive a control signal 32 that makes it operate the gas valve 50 and vent a small volume of the lighter-than-air gas 14 from the balloon structure 12. This decreases the buoyancy of the balloon structure 12 which causes a decrease in altitude.

The elongated tube 46 can support a light source 54 and/or a video projector 56. When inflated, the light source 54 and/or projector 56 extend into the balloon structure 12. By positioning a light source 54 on the elongated tube 46, the light source 54 can be positioned deep within the balloon structure 12. If used, the light source 50 is preferably a small matrix of LEDs that are capable of internally illuminating the balloon structure 12 in a variety of colors. Although the use of LEDs is preferred, small flash strobes can also be used. When activated, the light source 54 internally illuminates the balloon structure 12. The light source 54 is selectively activated by the controller 30.

If a video projector 56 is used, the video projector 56 projects images or video onto the interior of the balloon structure 12. The balloon structure 12 is translucent and the images can be perceived from outside the balloon structure 12. Accordingly, the balloon structure 12 appears to internally glow and display images visible to any observer. The projector 56 is also selectively activated by the controller 30.

The drone assembly 10 carries the electronics suite 20. The electronics suite 20 contains various electronics, depending upon the intended use of the drone assembly 10. That is, a drone assembly 10 configured for security, may carry a different electronics suite 20 than a drone assembly 10 intended to play music. The electronics that can be configured into an electronics suite 20 include a camera 74, microphone 75, speakers 76, auxiliary sensors 77, active transceivers 79, a location beacon 81 and a memory 78 capable of holding audio files and video files. The auxiliary sensors 77 can include various sensors, such as motion sensors, sound detectors, smoke detectors, carbon dioxide detectors, light detectors, temperature sensors, humidity sensors and/or air quality sensors. The auxiliary sensors 77 can also include directed sensors, such as sensors that can read RFIDs and signals from other drone assemblies 10.

The electronics suite 20 can be customized for an application. For example, if the electronics suite 20 is configured for surveillance, the electronics suite 20 would include cameras 74 and a microphone 75. When in flight, the drone assembly 10 is capable of recording video with the camera 74 and storing the video as a file in the memory 78. The video file can be downloaded when the drone assembly 10 is docked in a base station. Alternatively, the drone assembly 10 can be equipped with an optional transmitter (not shown) that enables the video files to be streamed to the smart phone 35 using the personal area network 33.

The camera 74 can also be used as part of a computer vision system that is operated by the controller 30. Using computer vision, the drone assembly 10 may be able to identify a person and follow that person. Alternatively, the imagery captured by the camera 74 can be analyzed, wherein the drone assembly 10 can respond to visual gestures made by a person. Likewise, sounds captured by the microphone 75 can be analyzed, wherein the drone assembly 10 can respond to specific verbal commands or sound commands.

The electronics suite 20 can be configured for entertainment. In such a configuration, the speakers 76 would be utilized. Audio files, such as music or sound effects, can be stored in the memory 78 and can be played by the drone assembly 10 when in flight. Furthermore, if the projector 56 is provided, video files can be projected from the drone assembly 10 and projected into the interior of the translucent balloon structure 12. The audio files and video files used by the projector 56 can be stored in the memory 78 or can be streamed to the drone assembly 10 using the personal area network 33. It will therefore be understood that music and video stored on the smart phone 35 can be transmitted to the drone assembly 10 while in the personal area network 33, wherein the drone assembly 10 will broadcast the music files and/or video files.

Another application for the drone assembly 10 is monitoring. The drone assembly 10 can monitor an area for various anomalies, while flying through or above that area. Active transceivers 79 can be included in the electronics suite 20 being carried. The active transceivers 79 include radar transceivers, lidar transceivers or time-of-flight transceivers. Such transceivers 79 actively transmit and receive signals that are sent to the controller 30 and are used to navigate the drone assembly 10 and prevent the drone assembly 10 from impacting obstacles.

Alternatively, the location beacon 81 can be utilized to transmit an IR signal from the drone assembly 10 that can be detected by external sensors placed in a room. The external sensors can transmit data to the controller 30, therein informing the controller 30 of the location of the drone assembly 10 in a room. In this manner, the drone assembly 10 can be actively directed around obstacles without having to carry an active transceiver.

The electronics suite 20 can also be configured with auxiliary sensors 77, in the form of motion detectors, smoke detectors or air quality sensors. In this manner, the drone assembly 10 can actively fly through an area looking for danger. The ability of the drone assembly 10 to fly, eliminates blind spots in sensor coverage that exist with static sensors. The ability to detect danger is therefore greatly increased.

Preferably, in flight, the control unit 16 of the drone assembly 10 relies upon the personal area network 33 for multiple functions. First, the person using the smart phone 35 can send specific flight instructions to the drone assembly 10, in the manner of a traditional remote control. As such, a person can steer the drone assembly 10 using the propulsion system 18 and can control the altitude of the drone assembly 10 by changing its buoyancy. The personal area network 33 can also be used for a variety of preprogrammed automatic functions. For example, if the radio signal received by the drone assembly 10 within the personal area network 33 becomes weaker than a predetermined threshold, it will be understood that the drone assembly 10 has traveled too far. In such a scenario, it may be assumed that the drone assembly 10 is being poorly piloted or has been overcome by strong winds. This would cause the drone assembly 10 to exit the personal area network 33 and no longer be capable of controlled flight. The controller 30 in the drone assembly 10 can be programmed with a subroutine that causes the vent port 52 to open and the drone assembly 10 immediately land as soon as it leaves the effective area of the personal area network 33.

The personal area network 33 generated by any smart phone 35 or WiFi hub 37 is coded and is unique to that smart phone 35. Signal coding enables the personal area networks of different people to overlap without interference. Signal coding also enables the personal area network 33 to operate as an electronic tether. That is, the drone assembly 10 can be programmed to hover at a set altitude near or around the device that is generating the personal area network 33. The drone assembly 10 can navigate using the signal strength of the personal area network 33 and maintaining a target object size in the image of the camera 74. Systems for creating a signal tether for a flying drone are exemplified by U.S. Pat. No. 9,367,067 to Gilmore, entitled "Digital Tethering For Tracking With Autonomous Ariel Robot", the disclosure of which is incorporated by reference.

Figure 3:
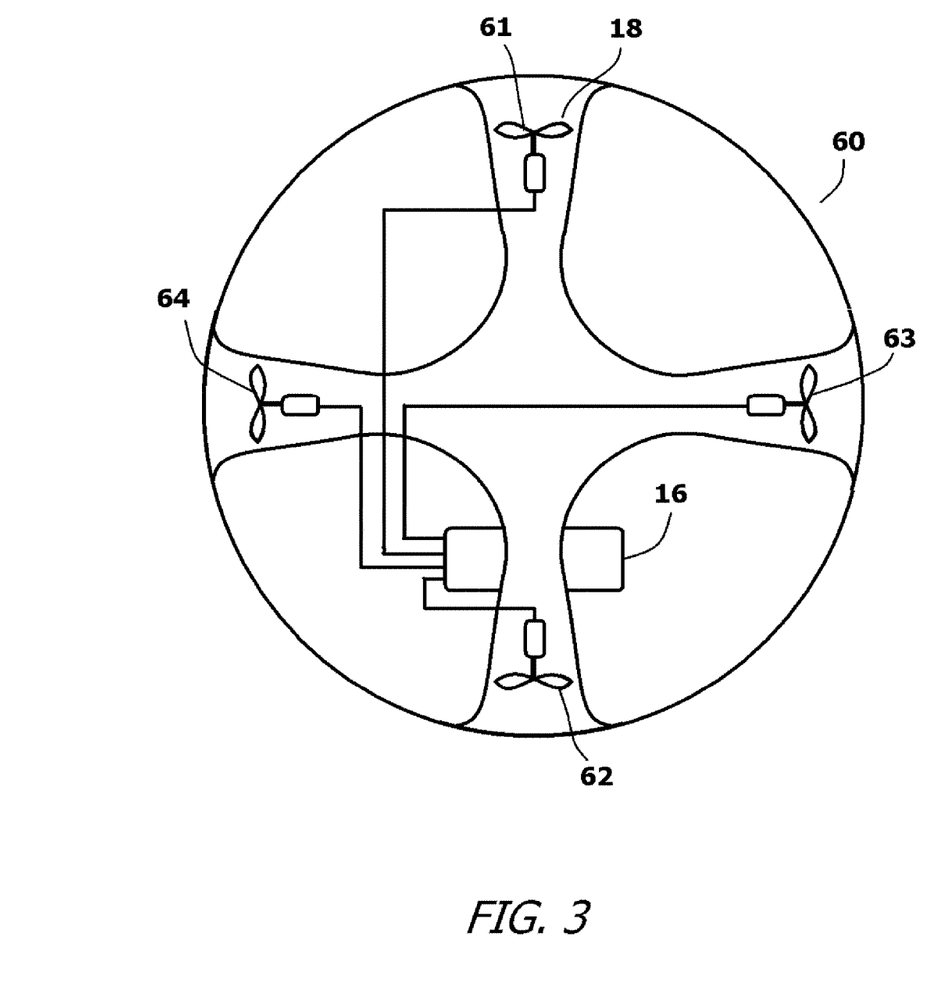
FIG. 3 shows an embodiment of the drone assembly containing a propulsion system that uses multiple internal propellers.

Referring to FIG. 3, an embodiment of the drone assembly 60 is shown that uses multiple propulsion systems 18. In this embodiment, the propulsion systems utilize propellers 61, 62, 63, 64 that are operated by the flight control unit 16. In this embodiment of the drone assembly 60, the drone assembly 60 can be made to move vertically and/or laterally by operating different propellers 61, 62, 63, 64 that are facing in different directions. In the shown embodiment, there are two vertical propellers 61, 62 to control up and down movement. Likewise, there are two horizontal propellers 63, 64 that control lateral movement. To rotate the drone assembly 60, the vertical propellers 61, 62 and/or the horizontal propellers 63, 64 can be rotated in opposite directions. This creates no propulsion. However, it does create gyroscopic forces. The gyroscopic forces can be controlled to actively turn the drone assembly 60.

Figure 4:
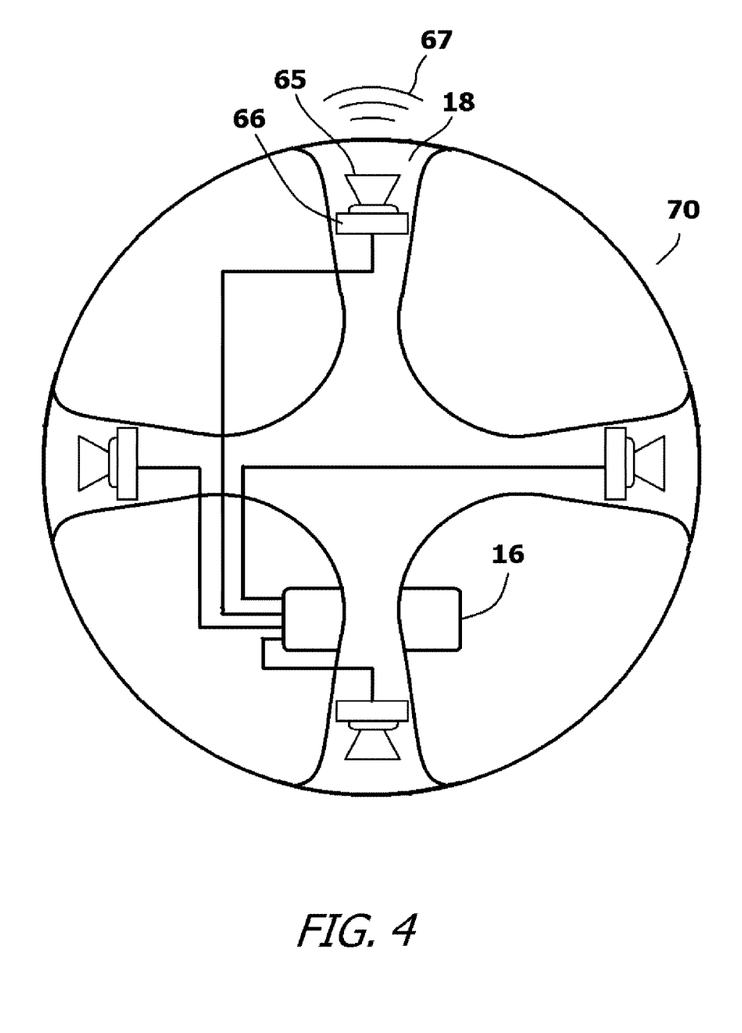
FIG. 4 shows an embodiment of the drone assembly containing a propulsion system that uses ultrasonic transducers.

Referring to FIG. 4, an embodiment of the drone assembly 70 is shown that uses multiple propulsion systems 18. In this embodiment, the propulsion systems 18 are ultrasound projectors 65. Each of the ultrasound projectors 65 has a piezoelectric transducer 66 that emits acoustic waves 67. The acoustic waves 67 push against the air and create an opposite thrust force to the drone assembly 70. By placing the ultrasound projectors 65 at different locations, the drone assembly 70 can be made to move vertically and/or laterally.

Figure 5:
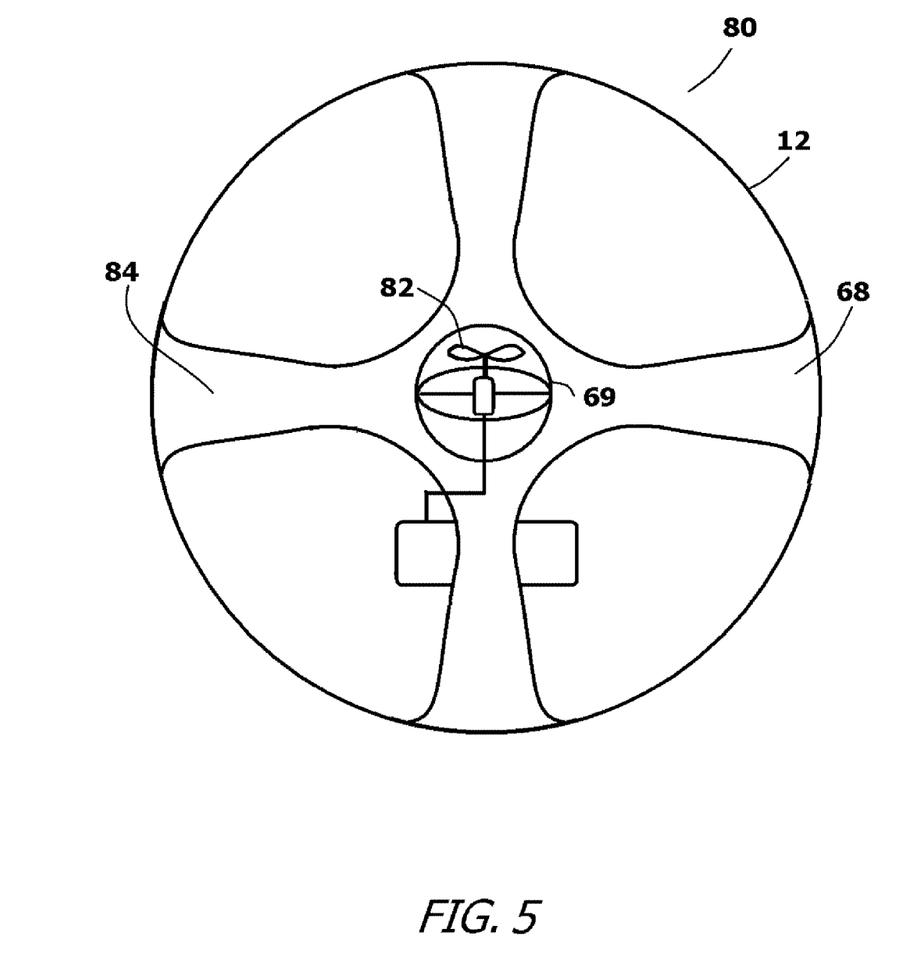
FIG. 5 shows an embodiment of the drone assembly containing a single internal propeller.

Referring to FIG. 5, an embodiment of the drone assembly 80 is shown that uses a single propeller 82 and a controllable gimbal 69 to move the propeller 82 in front of various openings 84 in the balloon structure 12. In this manner, one propeller 82 can be used to move the drone assembly 80 both vertically and horizontally.

Figure 6:
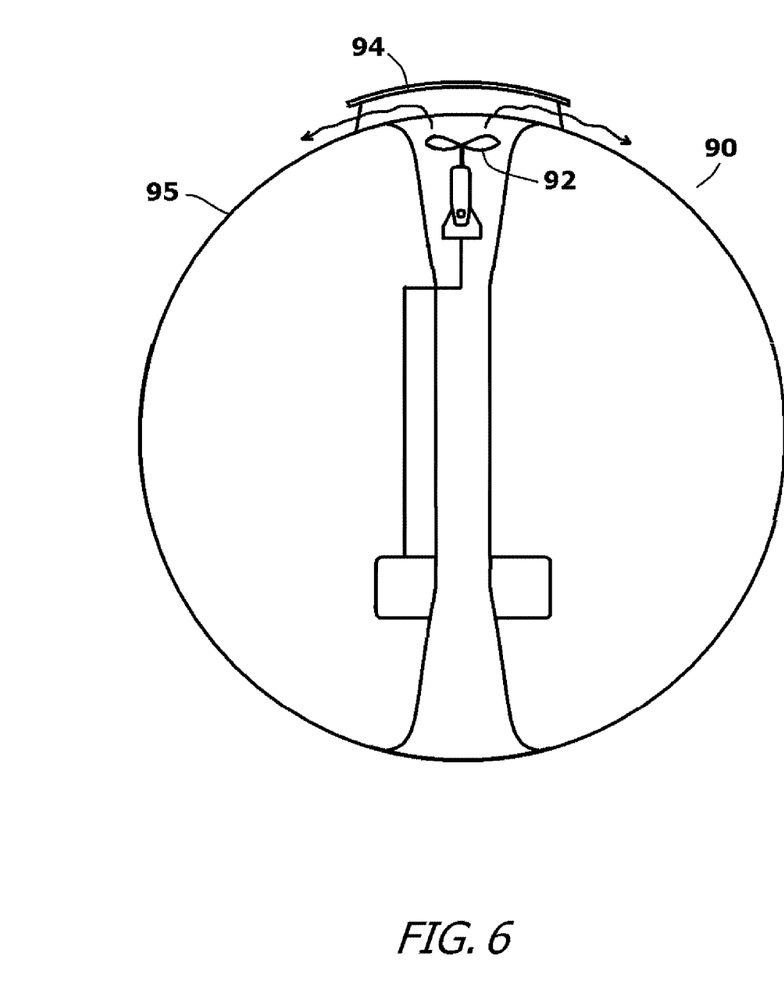
FIG. 6 shows an embodiment of the drone assembly containing a single internal propeller and baffle.

Referring to FIG. 6, an embodiment of the drone assembly 90 is shown where a single propeller 92 is used to direct air toward an adjustable baffle 94. The adjustable baffle 94 can direct the airflow along selected curved external surfaces 95 of the drone assembly 90. Thus, using the Coanda effect, the drone assembly 90 can be made to move in different directions.

Figure 7:
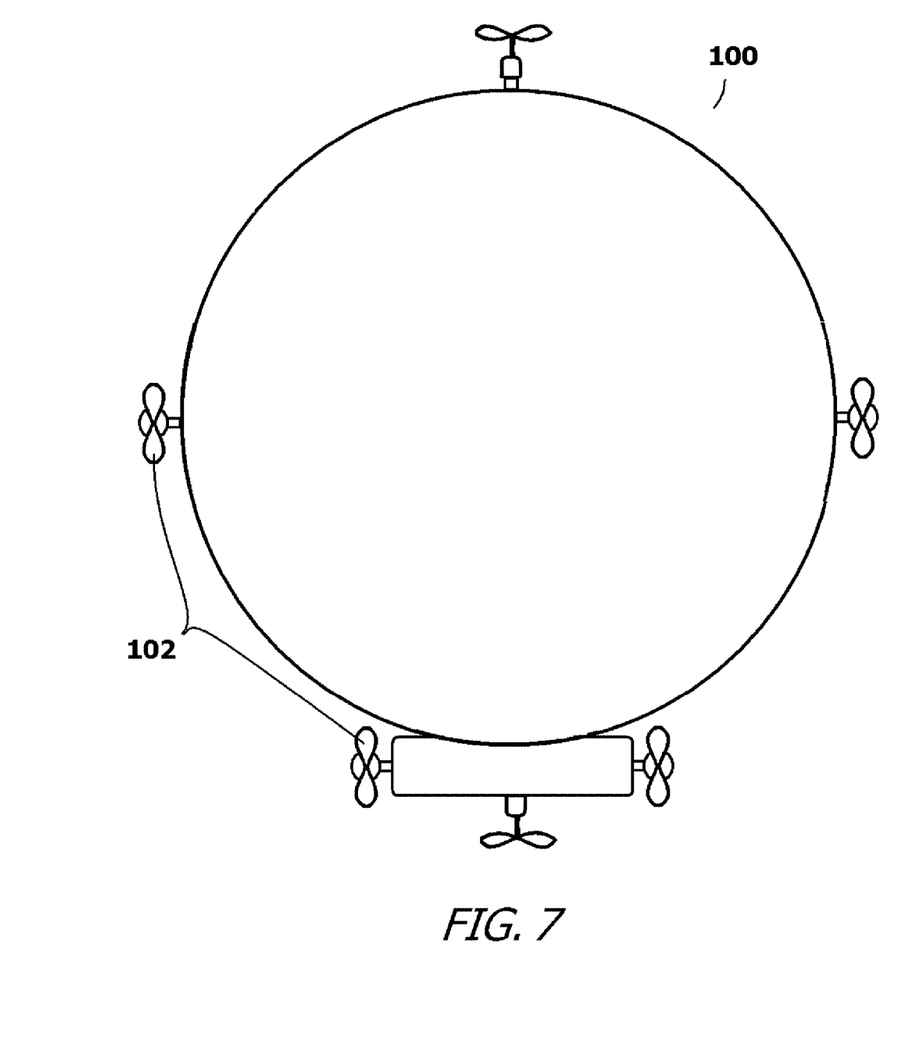
FIG. 7 shows an embodiment of the drone assembly with external propellers.

Referring to FIG. 7, an embodiment of the drone assembly 100 is shown, wherein the drone assembly 100 has external propellers 102.

Figure 8:
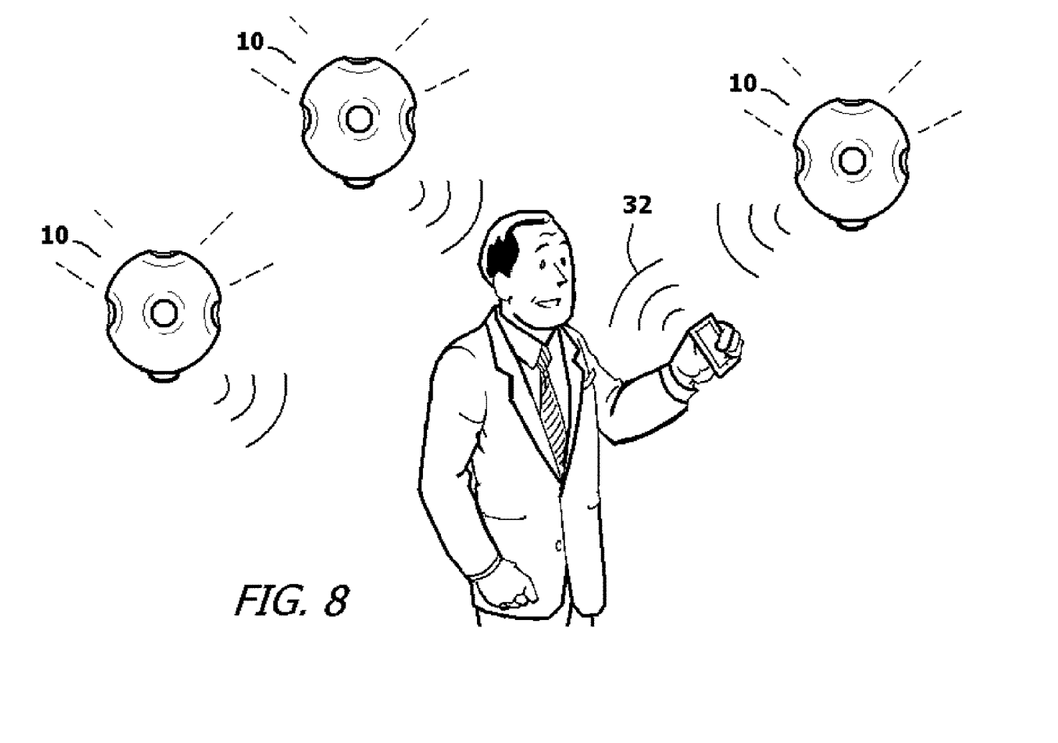
FIG. 8 shows an embodiment of the present invention that utilizes a plurality of drone assemblies.

Referring to FIG. 8, in conjunction with FIG. 1 and FIG. 2, a system is shown that uses multiple drone assemblies 10. The drone assemblies 10 can received command signals from a user or from other signal generators in an area. The control signals 32 can cause the drone assemblies 10 to act in unison to fly and/or float in a choreographed pattern. Likewise, music and signals can be transmitted from the multiple drone assemblies 10 simultaneously or in a predetermined pattern. For example, a line of drone assemblies 10 can light up sequentially as a person passes under the drone assemblies 10.

Figure 9:
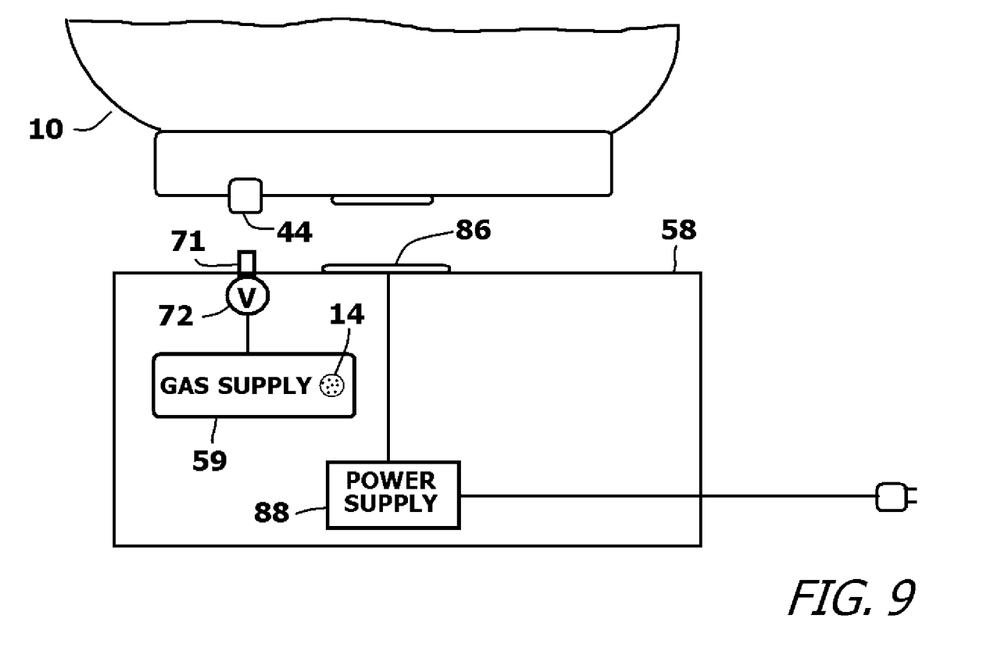
FIG. 9 shows the embodiment of the drone assembly shown in FIG. 1 being connected to a base station.

Referring to FIG. 9 in conjunction with FIG. 1 and FIG. 2, a base station 58 is shown for the drone assembly 10. The base station 58 contains a supply 59 of the lighter-than-air gas 14, such as helium. The supply 59 of lighter-than-air gas 14 can come in the form of replaceable cartridges. The base station 58 contains an AC/DC converter 88 and a recharging port 86 to recharge the battery 28 in the drone assembly 10. When the drone assembly 10 is not flying, it can be connected to the base station 58. When connected to the base station 58, the battery 28 in the drone assembly 10 interconnects with the recharging port 86, therein enabling the battery 28 to recharge. Additionally, when docked with the base station 58, the fill port 44 on the flight control unit 16 engages a nipple valve 71 that connects to a gas supply 59. A fill valve 72 is provided on the base station 58. The user manually activates the fill valve 72 to inject the gas 14 into the balloon structure 12. The base station 58 can be configured as a light fixture, so that the drone assembly 10 acts as a light when docked. Thus, the base station 58 can be part of a lamp, wall fixture or ceiling fixture.

The drone assembly 10 is filled with the lighter-than-air gas 14 on the base station 58. Likewise, the battery 28 on the drone assembly 10 is charged while the drone assembly 10 is connected to the base station 58. Once supplied and recharged, the drone assembly 10 is ready for flight. A person initiates a personal area network 33 using a smart phone 35 or a WiFi hub 37 and synchronizes the drone assembly 10 to the personal area network 33. Flight instructions can be sent to the drone assembly 10. Alternatively, the drone assembly 10 can be instructed to run preprogrammed functions, such as to hover within the local area network 33. While hovering, the drone assembly 10 can be internally illuminated. Furthermore, the drone assembly 10 can broadcast sound effects and/or music. Should the drone assembly 10 be blown by the wind or otherwise move out of the range of the personal area network 33, then the balloon structure 12 of the drone assembly 10 will immediately deflate and the drone assembly 10 will land.

The drone assembly 10 can be kept aloft for many hours using only a small battery 28 and a limited charge due to the fact that the drone assembly 10 can control its buoyancy in air so as to remain neutrally buoyant at a selected altitude.

No power is wasted in staying aloft. As such, power is only needed for lateral maneuvers and to operate the integrated electronics.

It will be understood that the embodiments of the present invention that are illustrated and described are merely exemplary and that a person skilled in the art can make many variations to those embodiments. For instance, the drone assembly can be made to have many different configurations. All such embodiments and configurations are intended to be included within the scope of the present invention as defined by the claims.

What is claimed is:

1. A remote controlled lighter-than-air drone assembly capable of prolonged flight time, comprising:
   a balloon structure for holding lighter-than-air gas;
   a reservoir for holding a volume of said lighter-than-air gas, wherein said reservoir is separate and distinct from said balloon structure and is carried by said balloon structure;
   a propulsion system carried by said balloon structure for providing thrust to said balloon structure;
   a control unit for selectively controlling said propulsion system, wherein said control unit also selectively transfers said lighter-than-air gas from said reservoir to said balloon structure, and selectively vents said balloon structure;
   an elongated tube that extends from said control unit into said balloon structure, wherein said elongated tube enables said lighter-than-gas to be supplied to, and drawn from, said balloon structure, and wherein said elongated tube supports said lights in said balloon structure;
   a receiver, carried by said balloon structure, that receives remote command signals from an external source, wherein said command signals are utilized by said control unit to operate said propulsion system;
   an electronics suite carried by said balloon structure for scanning an area below said lighter-than-air drone assembly when said lighter-than-air drone assembly is in flight.

2. The assembly according to claim 1, wherein said balloon structure is translucent and is internally illuminated with lights.

3. The assembly according to claim 2, wherein said lights are selectively controlled by said control unit.

4. The assembly according to claim 1, wherein said balloon structure is spherical when inflated.

5. The assembly according to claim 1, wherein said balloon structure contains open channels that pass through said balloon structure.

6. The assembly according to claim 5, wherein said propulsion system is disposed within at least one of said open channels.

7. The assembly according to claim 5, wherein said propulsion system includes a single propeller and a controllable gimbal to selectively direct said propeller toward said open channels.

8. The assembly according to claim 1, wherein said balloon structure has exterior surfaces and said propulsion system includes a propeller and an adjustable baffle that can direct the airflow from said propeller along said exterior surfaces to produce Coanda effect thrust.

9. The assembly according to claim 1, wherein said propulsion system includes a piezoelectric ultrasonic transducer.

10. The assembly according to claim 1, further including a solar cell carried by said balloon structure to produce electricity for said propulsion system.

11. The assembly according to claim 1, wherein said electronics suite contains at least one camera, at least one speaker, and a memory for holding video files and audio files.

12. The assembly according to claim 1, wherein said electronics suite contains sensors selected from a group consisting of: motion detectors, smoke detectors, carbon dioxide detectors, light detectors, temperature sensors, humidity sensors, air quality sensors, and directed sensors that can read RFIDs.

13. A remote controlled lighter-than-air drone assembly capable of prolonged flight time, comprising:
   a balloon structure for holding lighter-than-air gas, wherein said balloon structure has interior surfaces, exterior surfaces and is translucent to light;
   a propulsion system carried by said balloon structure for providing thrust to said balloon structure;
   a control unit for selectively controlling said propulsion system;
   an elongated tube that extends from said control unit into said balloon structure, wherein said elongated tube enables said lighter-than-gas to be supplied to, and drawn from, said balloon structure;
   a receiver, carried by said balloon structure, that receives remote command signals from an external source, wherein said command signals are utilized by said control unit to operate said propulsion system;
   a projector carried by said balloon structure that projects images onto said interior surfaces of said balloon structure that are visible through said balloon structure, wherein said elongated tube supports said projector in said balloon structure.

14. The assembly according to claim 13, further including speakers carried by said balloon structure for playing audio when said projector is in operation.

15. The assembly according to claim 13, further including a camera carried by said balloon structure for collecting at least some of said images used by said projector.

16. The assembly according to claim 13, wherein said balloon structure is spherical when inflated.

17. The assembly according to claim 16, wherein said balloon structure contains open channels that pass through said balloon structure.

18. The assembly according to claim 17, wherein said prolusion system is disposed within at least one of said open channels.

* * * * *